No. 849,273.
PATENTED APR. 2, 1907.
E. J. & T. R. SCHUIRMANN.
BEATER OR MIXER.
APPLICATION FILED JULY 10, 1906.
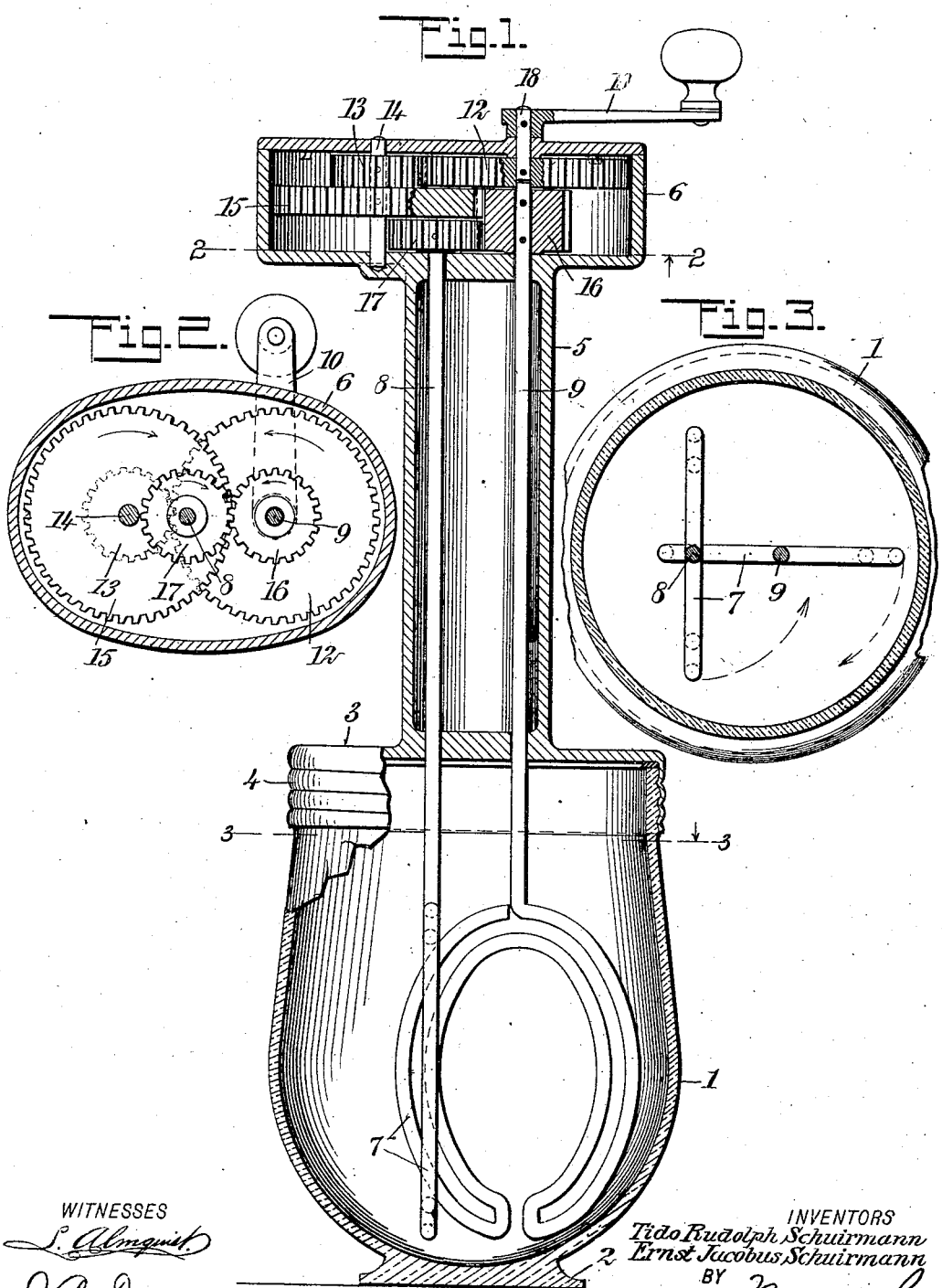
WITNESSES
INVENTORS
Tido Rudolph Schuirmann
Ernst Jacobus Schuirmann
BY
ATTORNEYS

UNITED STATES PATENT OFFICE.

ERNST JACOBUS SCHUIRMANN AND TIDO RUDOLPH SCHUIRMANN, OF CHENOA, ILLINOIS.

BEATER OR MIXER.

No. 849,273.      Specification of Letters Patent.      Patented April 2, 1907.

Application filed July 10, 1906. Serial No. 325,503.

*To all whom it may concern:*

Be it known that we, ERNST JACOBUS SCHUIRMANN and TIDO RUDOLPH SCHUIRMANN, both citizens of the United States, and residents of Chenoa, in the county of McLean and State of Illinois, have invented a new and Improved Beater or Mixer, of which the following is a full, clear, and exact description.

This invention relates to machines capable of use as egg-beaters, cake-beaters, cream-whippers or churns; and the object of the invention is to provide a device wherein all of the operating parts, save the crank, are completely inclosed during the operation of the device.

Reference is to be had to the accompanying drawings, which form part of this specification, in which drawings similar characters of reference indicate corresponding parts throughout the views, and in which—

Figure 1 is a vertical section through the entire apparatus. Fig. 2 is a cross-section on the line 2 2 of Fig. 1 in the direction indicated by the arrow, and Fig. 3 is a cross-section on the line 3 3 of Fig. 1.

According to the form of the invention here shown, it comprises a vessel 1, having a substantially hemispherical bottom and flanges 2 for supporting the same. Secured to the upper end, by means of a screw-threaded flange 4, is a cover 3, carrying the tubular handle 5. At the upper end of the handle is a casing 6, entirely inclosing the operating-gears. Within the vessel are the agitators 7, which are supported and operated by the rods 8 and 9. Each agitator and rod is preferably formed from a single piece of wire bent in the form shown in Fig. 1. The agitator does not come in contact with the wall of the vessel; but its outer edge is substantially parallel thereto. By having the blade of the agitator formed of two substantially parallel wires a broader beating-surface is provided, and a more efficient mixing of the contents of the vessel is thereby effected.

Within the casing 6 are a plurality of gear-wheels adapted to increase the speed of the agitators relative to that of the operating-crank 10. The crank 10 is secured to a short stub-shaft 18, extending through the upper part of the casing and carrying the gear-wheel 12 within the casing. Operated by the large gear-wheel 12 is a small pinion 13 on the auxiliary shaft 14, which latter also carries the large gear-wheel 15. On the upper end of the rods 8 and 9 are the intermeshing gear-wheels 17 and 16, respectively, the latter being in operating relation with the large gear-wheel 15. It will thus be seen that upon turning the crank 10 power is transmitted through the gear-wheels 12, 13, 15, and 16 to the rod 9 and from the gear-wheel 16 to the gear 17 and the rod 8, whereby the two rods and agitators may be rotated at high speed and in opposite directions.

In our improved device above described it will be noted that the operating-gears are entirely inclosed within the casing 6, whereby the operation cannot be interfered with by any foreign substance, and the oil used to lubricate the said gears cannot get upon the person of the operator or into the food being agitated. The operating mechanism and handle 5, being rigidly mounted on the cover 3 of the vessel, renders the complete device firm and steady, and from its compact construction it may be held in the hand while being agitated. The vessel 1, being provided with a tight-fitting cover, none of the contents thereof can become spilled or spatter out during the operation, and the device may be tipped at any suitable angle most convenient to the person using it. The beaters or agitators not being in contact with the walls of the vessel, the device is rendered more easily operated, and the friction is very materially reduced. It will also be noted that as the operating-rods 8 and 9 are supported both at the lower side of the casing 6 and also at the point where they pass through the cover 3, it is unnecessary to have any supporting means within the agitating vessel, and the only parts coming in contact with the contents of the vessel are the necessary agitators.

Having thus described our invention, we claim as new and desire to secure by Letters Patent—

1. In combination, a vessel having a cover, a tubular handle on said cover, agitating means in said vessel, and means at the outer end of the handle and passing therethrough for operating said agitating means.

2. In combination, a vessel having a cover, a tubular handle extending upward from said cover, a closed casing at the outer end of said handle, agitators in the vessel, gearing in the casing, means connecting the gearing and the agitators, and means outside of the casing and connected to the gearing for operating the agitators.

3. A beater or mixer comprising a vessel having a substantially hemispherical bottom, agitators in said vessel and supported free from contact with the walls thereof, a cover for the vessel, a tubular handle extending upward from the cover, a closed casing at the outer end of the handle, and operating-gears in the casing connected through the handle to the agitators.

In testimony whereof we have signed our names to this specification in the presence of two subscribing witnesses.

ERNST JACOBUS SCHUIRMANN.
TIDO RUDOLPH SCHUIRMANN.

Witnesses:
GEO. N. McCLURE,
H. E. PARTRIDGE.